United States Patent [19]

Jones et al.

[11] 3,816,917

[45] June 18, 1974

[54] TELEPHONE CONFERENCE AMPLIFIER

[75] Inventors: Ralph Archibald Jones, London; Roger John Litile, Woodford Green, both of England

[73] Assignee: The Post Office, London, England

[22] Filed: June 28, 1972

[21] Appl. No.: 267,204

[30] Foreign Application Priority Data

June 30, 1971 Great Britain .................... 30692/71

[52] U.S. Cl. ............................................. 179/1 CN
[51] Int. Cl. ........................................... H04m 3/56
[58] Field of Search ....... 179/1 CN, 1 VC; 330/110; 329/203

[56] References Cited

UNITED STATES PATENTS

| | | | |
|---|---|---|---|
| 3,511,931 | 5/1970 | Van Buren | 179/1 CN |
| 3,524,929 | 8/1970 | Burns et al. | 179/1 CN |
| 3,579,138 | 5/1971 | Harris | 330/110 |

OTHER PUBLICATIONS

"IBM Technical Disclosure Bulletin," Vol. 12, No. 11, April, 1970, pp. 1743–1744.

*Primary Examiner*—William C. Cooper
*Assistant Examiner*—Douglas W. Olms
*Attorney, Agent, or Firm*—Hall & Houghton

[57] ABSTRACT

A voice frequency transmission circuit includes a signal rectifier for producing an envelope signal from a voice frequency input signal and the envelope signal is added to the input signal to produce a unilateralized output signal, that is to say a signal having a unidirectional polarity. A telephone conference amplifier is described having several transmission paths each including voice frequency transmission circuit joined by respective diode circuits to a common point, and being connected to derive signals from the common point by other diode means, so that an input signal on one transmission path appears as an output on that and the other transmission paths associated with it in the conference amplifier. The presence of the diode circuits enables the unidirectional nature of the signal to prevent undesirable breaking-in from other signal transmission paths due to back-ground noise which may occur during a natural pause in the signal from the path active at the time. The signal rectifiers used include d.c. amplifiers with diodes connected in negative feedback paths over the amplifiers so as to produce an almost perfect diode characteristic.

5 Claims, 1 Drawing Figure

PATENTED JUN 18 1974 3,816,917
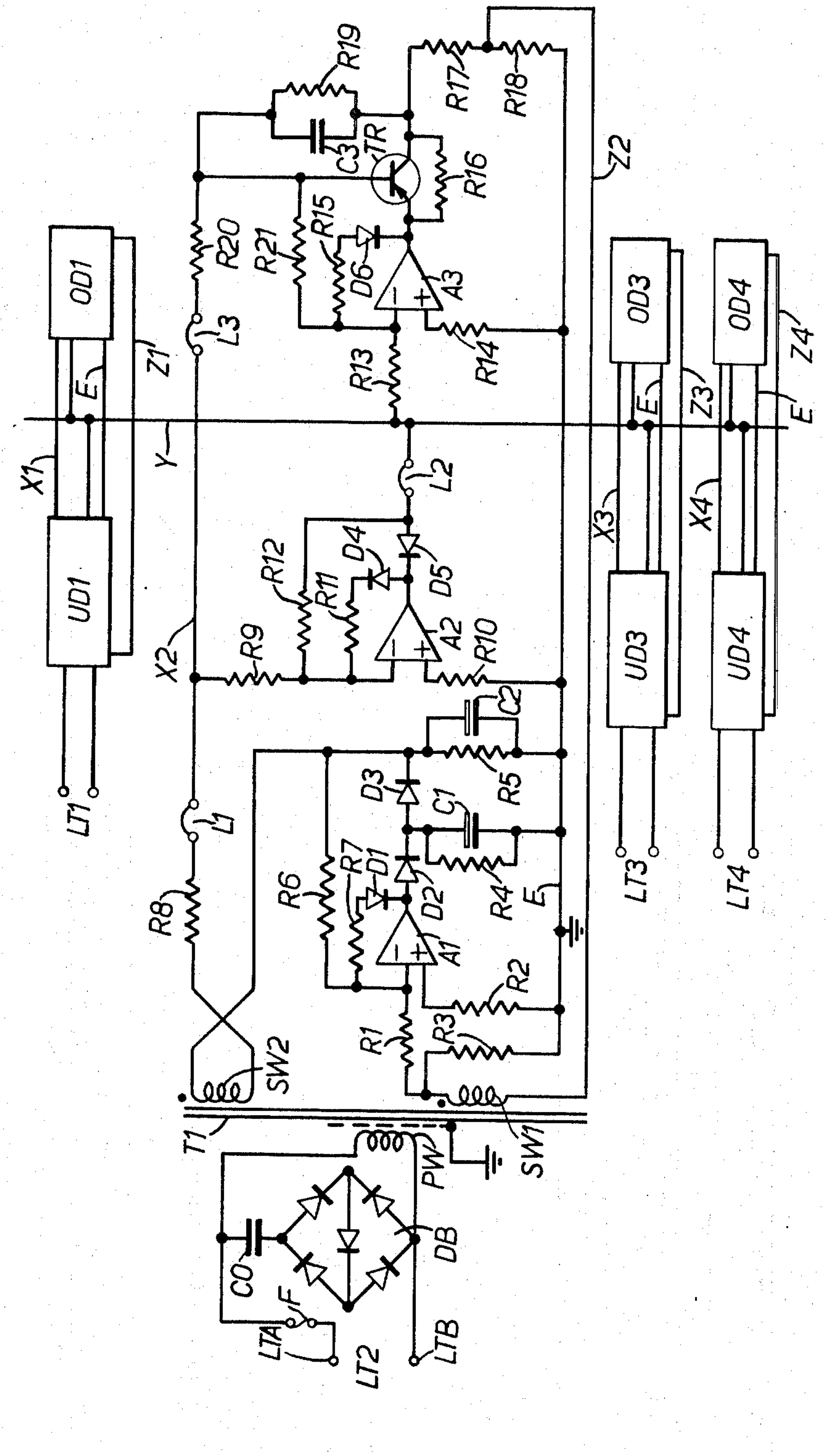

TELEPHONE CONFERENCE AMPLIFIER

This invention relates to telephone conference amplifiers.

In British Pat. specification No. 1,131,947, there is described a voice frequency transmission circuit in which the envelope of a voice frequency signal is added to the signal itself with such magnitude that the resulting signal is of unidirectional polarity, such a signal is referred to herein as a unidirectional polarity signal. Transmission circuits which perform this transformation are sometimes called unilateralizers and their effect upon voice frequency and other audio signals, unilateralization. Uni-directional polarity signals carrying speech are useful in telephone conference amplifiers, for example.

It is an object of the present invention to provide an improved telephone conference amplifier.

According to the present invention there is provided a telephone conference amplifier arrangement having a plurality of channels each of which includes means for receiving an input signal, means for producing an envelope signal from the input signal, means for combining the envelope signal and the input signal to produce a unidirectional polarity signal, first unilaterally conducting means connecting the particular channel to a point common to all of the channels for applying the unidirectional polarity signal of the particular channel to the point, second unilaterally conducting means connecting the common point to the particular channel to apply a unidirectional polarity signal at the common point to the particular channel, and means for deriving an output signal from the unidirectional polarity signal applied to the particular channel from the common point wherein feedback means is provided in each channel responsive to the unidirectional polarity signal from the common point and connected from the second unilaterally conducting means of the particular channel to the means for producing an envelope signal of the particular channel from the input signal for opposing the generation of an envelope signal.

As used here a "channel" is defined as a circuit providing a means of taking speech or other audio frequency information from a two-wire line and conveying it to two terminals and a means of taking speech or other audio frequency information from the two terminals and transmitting it to the same two-wire line in the form of speech or audio frequency signals. The terminals of the channels are connected to common points, like to like. For convenience one of the common points is earthed; the other is hereinafter referred to as the common point.

Preferably the first and second unilaterally conducting means in each channel of the conference amplifier are of a similar form to the rectifying means included in the voice frequency transmission circuit.

In order that the invention may be fully understood and readily carried into effect one embodiment of it will now be described, by way of example, with reference to the single FIGURE of the accompanying drawings which shows in diagrammatic form a conference amplifier circuit employing a voice transmission circuit.

Referring now to the drawing, the conference amplifier circuit shown includes four transmission channels of which only the second channel, numbered 2, is shown in detail, the other channels 1, 3 and 4 being similar to the channel 2. Each channel includes two terminals LT for connection to a telephone line, these channels being connected to a unilateralizer (or voice frequency transmission circuit) and incoming diode circuit UD from which two conductors X and E are connected to an outgoung diode circuit OD. Another connection from the circuit UD to circuit OD is connected to a conductor Y which forms a common point for all of the transmission channels. Signals of unidirectional polarity reach the conductor Y through the incoming diode circuits and leave the conductor Y through the outgoing diode circuit. A further connection from the circuit UD to the circuit OD is provided by the conductor Z feeding back the unidirectional polarity signal to the unilateralizer in the manner to be described below. In the different transmission channels the component references carry the number of the channel in addition to the reference letter except for the conductor E which is earthed and therefore common to all channels and the conductor Y which forms the common point of the channels.

Considering now the transmission channel 2 shown in detail, the line terminals LT2, carry the individual reference LTA and LTB, are connected via a fuse F to the primary winding PW of a transformer T1. In parallel with the winding PW, there is connected, via a capacitor CO a diode bridge DB for limiting the voltage excursion across the winding PW. The capacitor CO allows d.c. to be connected to LT2 if PW is used to loop the line. The transformer T1 has two secondary windings SW1 and SW2. T1 has turns ratios of 1: 1: 1, though other values may be used. One end of winding SW1 is connected through resistors R1 to the inverting input of the differential amplifier A1, the non-inverting input of which is connected through a resistor R2 to a conductor E connected to earth. The same end of the winding SW1 is connected through a resistor R3 to the conductor E. The output of the amplifier A1 is connected to the cathode of a diode D1 and the anode of the diode D2 the cathode of which is connected to the anode of a diode D3 and also through a capacitor C1 and a resistor R4 in parallel to the conductor E. The cathode of the diode D3 is connected to the conductor E through a capacitor C2 and resistor R5 in parallel, through a resistor R6 to the inverting input of the amplifier A1, and to one terminal of the winding SW2. The resistor R6 provides a first feedback path over the amplifier A1 and a second feedback path is provided by a resistor R7 connected from the inverting input of the amplifier A1 to the anode of the diode D1. The positions of D1 and R7 could be interchanged. The other terminal of the winding SW2 is connected alternatively through a resistor R8 and a link L1 to a conductor X2. The resistor R8 supplements the resistance of the winding SW2 and could be placed between SW2 and the resistor R6. The circuit of transmission channel 2 thus far described forms the voice frequency transmission circuit or unilateralizer with components chosen so that between the conductors X2 and E the unidirectional polarity signal is set up in response to the voice frequency signal applied to the line terminals LTA and LTB.

This unilateralizer is also a de-unilateralizer in that a unidirectional polarity signal applied to X2 and E will appear as a voice frequency signal at the line terminals LTA and LTB.

The lower end of the winding SW1 is connected to a conductor Z2 for a purpose to be explained in detail later, but in understanding the unilateralizing operation of the unilateralizer, it may conveniently be regarded as being connected to the conductor E. The values of resistors R1, R6 and R7 are chosen so that the effective gain of the amplifier A1 is such as to give a unilateralization factor of about three. The unilateralization factor is defined as the ratio of the d.c. components to the peak a.c. component of the unidirectional polarity signal set up in response to a steady voice frequency signal applied to the line.

A second differential amplifier A2 is provided having its inverting input connected to the conductor X2 via a resistor R9, the non-inverting input of A2 is connected to the conductor E through a resistor R10. The output of the amplifier A2 has connected to its inverting input a first feedback path formed by a diode D4 and a resistor R11 in series, the anode of the diode D4 being connected to the output of the amplifier A2, though the positions of these two components could be interchanged. A diode D5 is provided connected from the output of the amplifier A2 to the common conductor Y via a link L2. The cathode of the diode D5 is connected to the output of the amplifier A2 and the anode of D5 is also connected via resistor R12 to the inverting input of the amplifier A2. The circuit described in this paragraph forms the incoming diode circuit for coupling the unidirectional polarity output signal from the unilateraliser to the common conductor Y. The values of the resistors are usually chosen so that this diode circuit introduces a small voltage loss.

The conductor Y is connected through a resistor R13 to the inverting input of a further differential amplifier A3, of which the non-inverting input is connected to the conductor E through a resistor R14. A negative feedback path consisting of a resistor R15 and a diode D6 in series is connected from the inverting input of the amplifier A3 to its output, the cathode of the diode D6 being connected to the output of the amplifier A3. The positions of D6 and R15 could be interchanged. The output of the amplifier A3 is also connected to the emitter electrode of a transistor TR having a resistor R16 connected from emitter to collector; with some transistors R16 can be omitted. The collector of transistor TR is connected to the conductor E through resistors R17 and R18 in series, and also through a resistor R19 in parallel with a capacitor C3 to the base electrode of the transistor. With some transistors only C3 or R19, or neither, is necessary. Conductor Z2 is connected to the junction of resistors R17 and R18. The base electrode of the transistor TR in addition to being connected to resistor R19 and capacitor C3 is connected to the conductor X2 through a resistor R20 and a link L3, and through a resistor R21 to the inverting input of the amplifier A3. This part of the circuit forms the outgoing diode circuit of the path 2 connecting the uni-directional polarity signals from the conductor Y to the conductor X2. It also applies a portion of the unidirectional polarity signal to the conductor Z2. The values of the resistors in this part of the circuit are usually chosen so that a small voltage loss is introduced into the unidirectional polarity signal.

The operation of the unilateralizer will now be described. A voice frequency signal applied to the line terminals LTA and LTB will appear across the primary winding PW subject to any limitation on its amplitude imposed by the diode bridge DB. The voice frequency signals appear across the secondary windings SW1 and SW2, and from the secondary winding SW1 they are applied to the inverting input of the amplifier A1, the effect of the connection to the conductor Z2 being simply that some of the SW1 voltage is lost across R18. The amplifier A1 has a high gain but because of the feedback connection through diode D1 and resistor R7, its effective amplification is limited to the ratio R7 and R1 when the diode D1 is conducting but is not so limited when the output voltage of the amplifier is smaller than the threshold voltage at which the diode D1 becomes conducting. Thus for positive going inputs to the amplifier A1 the threshold voltage of the diode D1 is divided by the amplification factor of the amplifier A1. Diodes D2 and D3 in conjunction with the resistors R6 behave similarly for negative going inputs to the amplifier A1, and therefore at the junction of diode D3 and resistor R6 there appears a d.c. voltage corresponding to the peaks of the voice frequency signal as if rectified by a nearly ideal diode. Resistors R6 and R7 have the same value of resistive impedance. The time constant circuit C1R4 has a relatively long time constant to achieve adequate smoothing of the rectified voice frequency signal, but circuit C2R5 has a much smaller time constant for reasons to be explained later, and the extra diode D3 is provided to isolate C1 from C2R5 for positive going signals applied across C2R5, which occurs during signals outgoing to line. R4 is many times R5 and operates during outgoing signals as explained later.

When a voice frequency signal comes from the line, the envelope signal appearing across the capacitor C2 is added to the voice frequency signal appearing across the secondary winding SW2 by virtue of their connection in series. The polarity of the connections to SW2 relative to that of those to SW1 is important as detailed later. The combined envelope and voice frequency signal, now of uni-directional polarity, appears between the conductor X2 and earth. Thus a unilateralized or unidirectional polarity signal is applied to the incoming diode circuit including the amplifier A2 which operates in the manner described above for A1, except that, of course, the third diode D3 is not required in this circuit. Also, during conduction of the incoming diode circuit, because the input is positive going, the output is negative going and is taken from D5 anode. The negative going uni-directional signal from the incoming diode circuit is applied to the common conductor Y and assuming that this is the only signal being applied to the conductor Y, the other transmission channels being silent, then this signal is applied to the outgoing diode circuits including that of the path 2 having the amplifier A3. The outgoing diode circuit is similar to the incoming diode circuit including the amplifier A2 except that the second diode is replaced by the base-emitter diode of the transistor TR. Also, during conduction of the outgoing diode circuit, any input to A3 is negative going so that the output is positive going. Except for the channel 2, the uni-directional output signal appears on the base of the transistor TR, and is applied through the resistor R20 to the conductor X whence it passes back to the unilateralizer and appears as a voice frequency signal at the line terminals LTA and LTB. The unidirectional polarity signals applied to the emitter of the transistor TR in the channel 2 switch it to full saturation so that the signal from the outgoing diode circuit also appears on the collector of the transistor and a portion of the signal is picked off at the tapping between resistors R17 and R18 and applied via the conductor Z2 to the lower end of the secondary winding SW1. The voice frequency component of the signal fed on Z2 back to the lower end of SW1 is arranged to be of such magnitude, and phase as to oppose the signal produced across SW1 by the signal fed to SW2, thus eliminating the feeding of a voice frequency signal to the rectifier corresponding to the outgoing voice frequency signal. This is referred to as neutralization. It is pointed out that the signal applied to the conductor Z2 by the transistor TR includes the envelope component, which opposes any envelope signal appearing at the output of the amplifier A1. The feeding back of the envelope component in this way has the effect of causing some hysteresis or back-lash in the system because the D.C. signal which is relatively large because of the unilateralization factor of three is applied down the conductor Z to the unilateralizer of each of the transmission channels, except path 2 which operates as described below, and has to be overcome by a signal on any line competing for control. This serves to inhibit interruption of communication from the channel which is in control at the time (assumed to be 2) to the other channels (1, 3 and 4) by spurious low level noises in any of the other channels and is therefore a desirable effect. Further hysteresis is due to another cause mentioned later. The same effect works against the production by the rectifier of an envelope component corresponding to an outgoing signal thereby covering any imperfections in neutralization.

On outgoing signals the amplifier A1 gives a negative output and there is a finite value to the reverse resistance of D2. Thus C1 could become reverse biased. This has not proved dangerous to C1, but has been known to give rise to switching clicks. The inclusion of resistor R4 prevents this.

The resistor R16 connected from the collector to the emitter of the transistor TR controls the retention (defined below) and the switching sensitivity in the manner also described below. If the germanium transistor is used, its leakage (in the opposite direction from the usual $I_{co}$) dispenses with the need for R16. The capacitor C3 and resistor R19 provide negative feedback over the transistor TR and help to ensure its stable operation. Usually only C3 or R19 is necessary. If the transistor has poor h.f. gain then neither C3 nor R19 is necessary.

The links L1, L2 and L3 are provided to enable the different parts of the transmission channels to be isolated one from the other, and thereby assist in setting up the system which involves adjustment of present controls associated with the differential amplifiers. In normal operation the links L1, L2 and L3 will all be short circuited as shown in the FIGURE It is now necessary to consider the operation of the circuit so as a whole, bearing in mind that its intended function is to provide coupling between the telephone lines connected to the line terminals LT1, LT2 L13 and LT4 of the four transmission channels shown, and enable the speaker on one path to be heard on all the other channels. It is possible for any channel to be in any one of three states, though the state of the channel at any time depends upon the states of the other channels. Two of these states are complementary; a channel may be in a receiving state with a signal from line in control or it may be in a sending state with a signal from Y in control. But there is another, a third state, which a channel adopts if a signal, incoming from line, ceases without incoming signals appearing on any other line. This is the state of retention of the control (i.e. by the last channel to have a signal from line) and is useful during natural hesitations and short lulls in sentences, the other channels remaining in the sending state already mentioned. The mechanism of establishment of this third state will be described later. The other two states which exist during active periods of conversation will be dealt with first.

Assuming that the speaker is on channels 2 so that a unilateralized positive going signal appears on conductor X2 relative to ground, this signal is inverted in polarity by the amplifier A2 and is applied to the common conductor Y as a negative going signal. The outgoing diodes of all of the channels are connected to the conductor Y and will receive the negative going signal from it. In the channel 2 the conductor X2 has a positive voltage from the unilateralizer and this is applied through resistor R20 to the outgoing diode circuit of that channel. The negative going voltage on the conductor Y is of slightly smaller magnitude and by virtue of the coupling through resistors R13 and R21, the voltage appearing at the inverting input of the amplifier A3 is slightly positive going. Thus the output of the amplifier A3 is negative so that the negative feedback path through diode D6 and resistors R15 is operative to bring the inverting input terminal of the amplifier A3 to a virtual earth. The negative going output of the amplifier A3 also reverse biases the emitter-base junction of the transistor TR so that there is no signal transmission from the output of the amplifier to the conductor X2 or conductor Z2. The positive voltage on the base and near zero voltage on the collector prevent TR switching on with the roles of the emitter and the collector interchanged. Thus in the channels 2 the unilateralizer does not receive a DC signal opposing the envelope component nor does neutralization occur, and therefore the positive going signal on the conductor X2 is of the full amplitude generated by the voice frequency signal.

In the other transmission channels, however, taking path 1 as exemplary, the outgoing diode OD1 receives a negative going signal from the conductor X. This appears as a slightly smaller but similar positive going signal on the output of the amplifier A3 of that channel. The emitter-base junction of the transistor TR acts as a diode, transmitting the uni-directional signal over the conductor X1 to the unilateralizer of the channel 1. Here it is applied across the winding SW2, the capacitor C2 completing the circuit to earth for voice frequency signals, and the resistor R5 completing the circuit to earth for the d.c. component so as to keep the outgoing diode switched on. The coupling between the windings SW2 and PW causes the voice freuqncy signal to appear at the line terminals LT1. In order to keep the base-emitter diode of the transistor TR of the channel 1 adequately conducting the envelope component of the unidirectional polarity signal must have a low time constant path to earth, and this is assured by arranging that the time constant of the circuit C2R5 is small compared with the time constant of circuit C1R4 which is the decay time constant of the unilateralized signal itself. Signals reflected from line and appearing at SW2 also tend to upset the conduction of the outgoing diode. It is for this reason that a unilateralization factor of at least two is regarded as desirable. The signal on the conductor X1, being positive going reverse biases the diode D3 and therefore prevents the capacitor C1 being introduced in parallel with the capacitor C2; this operates the buffering necessary for the satisfactory reverse operation of the unilateralizer. Because D3 is within the feedback path of A3 its operation in this respect approaches that of an ideal diode.

In the channel 1 the transistor TR being turned on by the output of the amplifier A3 effectively connects this output to the resistors R17 and R18 in series, so that the unilateralized signal, now positive going, is applied along the conductor Z1 to the amplifier A1. This has two effects as mentioned before, the one is that the a.c. component neutralises the input to A1, due to the voltage induced into SW1 by the outgoing signal, the other is that the d.c. component opposes the production of an envelope component by the unilateralizer corresponding to any competing input and also, particularly important, corresponding to the outgoing signal. This last point is important because, as mentioned later, R8 and R20 make perfect neutralization impossible.

It will be apparent that the feeding back of the envelope component over the conductor Z in the channels other than that which is active at the time produces a hysteresis or backlash effect in that the active channel tends to remain active and will only be interrupted by a signal of somewhat greater amplitude from one of the other channels, as such an interrupting signal has to overcome the effect of the envelope component fed down the conductor Z, which is three times the value of the speech signal peaks.

The connections to windings SW1 and SW2 should be as shown (a) for the purpose of neturalization as already mentioned and (b) to prevent the conference amplifier going into low-frequency oscillation.

It is now necessary to consider the behaviour of the incoming diode, that is to say a circuit including the amplifier A2, of a non-active transmission channel in response to signals on the conductor Y. As explained above, the signals on the conductor Y are negative going and those on conductor X slightly smaller and positive going. As a result, by virtue of the values of resistors R9 and R12, a negative voltage tends to appear on the inverting input of the amplifier A2. The output of the amplifier A2 is thus positive and therefore the feed-back path including the resistor R11 and diode D4 is operative bringing the input of the amplifier A2 to a virtual earth. The diode D5 is reverse biased by these signals so that the only conducting path from the common conductor Y is the resistor R12 to the virtual earth.

The third state referred to above, in which a transmission channel with a signal from line retains control during intersyllabic pauses and lulls in speech, arises as follows. Consider a signal from LT2, in control. Diode D6 is conducting, but because it is a silicon diode anything up to 0.7V negative appears on the output of A3. Consider the signal disappearing with no signals from other lines to take over control. The negative voltage on A3 output gradually falls. At a certain point in time the negative current through R16 into R17 exceeds the positive current through R19 into R17 (If TR is a germanium transistor the internal leakages replace R16 and R19). The voltage feed back to the unilateralizer on Z2 now becomes negative and the net feedback in the loop consisting of unilateralizer, incoming diode, outgoing diode and conductor Z2 becomes positive feedback. More of the gain of A3 comes into play in this loop as voltages continue to fall and eventually a stable condition is reached at which the loop gain has risen to unity. To summarize, under this condition, a small negative voltage is fed back to the unilateralizer on Z2 causing a positive output from the rectifier of the unilateralizer which slightly forward biases the incoming diode and maintains the outgoing diode out-off, and vice verse for all the other channels. The effect is thus one of retention of control by a channel after the controlling signal from line has ceased. A signal on another channel wishing to gain control has to overcome the standing signal at Y due to the channel which last had control. Thus "retention," as the effect is called, limits switching sensitivity.

Although it reduces switching sensitivity, a certain amount of retention is desirable as it saves loss of control on weak syllables in an otherwise acceptable signal. Moreover it helps to avoid the amplitude distortion which occurs at low levels in the telephone conference repeaters described in British Pat. specifications Nos. 1,131,947 and 1,218,550.

Although as described above, both incoming and outgoing diode circuits introduce a small loss into the signal for stability purposes, it is not necessary that both of these circuits introduce a loss, one of them may introduce a gain, provided that the other introduces a loss slightly exceeding this gain. Nor do all transmission channels have to be alike in this respect. Thus in a conference amplifier used at a private branch exchange the incoming diode of the exchange line channel may introduce gain and those of the extension lines channel may introduce loss, so that the levels of signal on Y from all channels are about the same. All participants then hear everyone at about the same level.

The principle upon which the conference amplifier operates makes it appear high impedance to an incoming signal when that signal is in control but low impedance to the lines on which signals are not in control. This would give rise to a low return loss at all times. It is necessary to increase the return loss in order to reduce side-tone at the telephone instruments and also to assist in the problem of balancing at a two-wire to four-wire transformation point in the telephone network.

The return loss can be increased with the minimum increase of insertion loss by (a) the introduction of the resistor R8 or the resistor R20 in series with the conductor X2, to increase the impedance presented to line by a channel in a sending state, and (b) the provision of the resistor R3 which serves to reduce the impedance presented to line by a channel in a receiving state. By virtue of neutralization, R3 is switched out of circuit, and its shunt loss avoided on outgoing signals. The value of resistor R20 is chosen bearing in mind that whilst feeding the outgoing signals to a reactive line, the signal current to the line will be out of phase with the voltage driving it, so that the inclusion of the resistor R20 could cause faulty operation of the voice switching of the incoming and outgoing diodes due to the phase change across the resistor R20. The use of the resistor R8 instead of R20 avoids the risk of this trouble, and, as it is small in value compared with R9, it introduces only a small loss on incoming signals. The inclusion of R8 and R20 interferes with the basic principle of operation of the conference amplifier in that for good neutralization of outgoing signals it is desirable to feed the signals to the transformer from a low impedance source so that variations in the magnitude and angle of the impedance of the line are of no consequence. Although it would apparently be better to introduce the additional impedance on the line side of the transformer this would have the disadvantages of increasing the input impedance and of increasing the insertion loss. The values of R8 and R20 together with the resistances of the transformer windings should be chosen to provide a reasonable compromise.

"Hysteresis or backlash" has been mentioned. It is increased by the difference in impedance of a transmission channel seen from its line terminals before and after signals from line get control. When sending signals to line the impedance of a channel is mainly R8 + R20 but when under control of signals received from line the impedance of a channel is mainly R3.

In one design of a telephone conference amplifier produced in accordance with the embodiment described above, for use with 600 ohm telephone lines, the components were as follows:

| | | | | |
|---|---|---|---|---|
| Amplifiers A1, A2 and A3 | | | integrated circuit type Texas Instruments SN72741N, | |
| Transistor Tr ACY17 | | | | |
| Diodes of DB, D4 and D6 | | | OA202 | |
| Diodes D1, D2, D3 and D5 | | | AAZ17 | |
| Capacitor Co | | | short circuit 00μF | |
| Capacitor C1 | | | tantalum 100μF | |
| Capacitor C2 | | | tantalum 5μF | |
| Capacitor C3 | | | omitted | |
| Resistors | R1 | 8.2K | R12 | 68k, |
| | R2 | 0 | R13 | 68k, |
| | R3 | 1k | R14 | 0 |
| | R4 | 10k | R15 | 62k |
| | R5 | 820 | R16 | omitted |
| | R6 | 33k | R17 | 150 |
| | R7 | 33k | R18 | 330 |
| | R8 | 330 | R19 | omitted |
| | R9 | 39K+33k | R20 | 0 |
| | R10 | 0 | R21 | 68k |
| | R11 | 62k | | |
| Fuse | | | F 100mA | |
| Transformer TI | | | Ratios 1:1:1 | |
| Primary Winding | | | PW 19 ohms | |
| Secondary Winding | | | SW1 and SW2 52 ohms each | |

A circuit employing the above component values is intended for use with nine transmission channels and requires a power supply of 15-0-15V for the integrated circuit amplifiers. It is estimated that conference amplifiers of a size up to about 60 lines could be constructed on the basis of the system described above. The only limitation is the power handling capacity of the amplifier A2. Whatever the size, there would be no change in the insertion loss or gain from that introduced in the nine line system. The approximate insertion loss of the embodiment described above is 2½dB, and return loss is 9.5dB, switching sensitivity is about 40dB relative to 1 volt and there is 13dB of switching hysteresis.

The introduction of R8 and R20 degrade the neutralization of the repeater and to improve the position resistor R17 is provided which diminishes the neturalization signal fed along the conductor Z2 to the unilateralizer to roughly the same extent as R8 and R20 with a 600 ohm line reduce the signal to be neutralized. The resistor R17 also reduces the envelope component which is fed back from the transistor TR to the winding SW1 over the conductor Z2. This lessens the inhibiting effect on competing incoming signals and it may be desirable to do so.

When germanium transistors are used for TR, emitter to collector leakage is rather large and R16 is omitted. The switching sensitivity of the conference amplifier is then controlled by the value of R18. The collector load of TR also loads A3 and therefore has a minimum value. Thus the introduction of R17 permits a smaller value for R18 and this increases the switching sensitivity of the conference amplifier.

When silicon transistors are used the use of different values of R16 for the various channels gives them different sensitivities. This can be useful when, on for instance, a conference amplifier at a private branch exchanger, it is desired to give a greater sensitivity to the exchange line than to the extensions. Reduction of the resistor R18 also reduces the loss due to the potentiometer effect of R3 and R18 on the incoming signal voltage fed from the winding SW1 to the amplifier A1. This permits a reduction to be made in the effective gain of the amplifier A1, by increasing R1, whilst achieving the same unilateralization factor. When this is done, A1 gives a smaller negative output for the same d.c. component fed back on Z2 but gives the same voltage as before to the rectifiers D2, D3 for a given level of signal from line LT2. In this way, reduction of R18 reduces hysteresis.

Typically introduction of R17 coupled with reduction of the resistor R18 and reduction in the gain of amplifier A1 results in a decrease in the switching hysteresis and an improvement of switching sensitivity of nearly 5dB when a germanium transistor is used as the component TR. There is an advantage to be gained from the use of a germanium transistor as TR because the leakage of such a transistor has an opposite temperature co-efficient to that of the forward delay voltage of a silicon diode which is employed as D6. Thus temperature compensation to avoid sensitivity changes is inherent in the selection of the semiconductor devices.

In the diode circuits it is advantageous to employ gold bonded germanium diodes in the unilateralizer rectifier and as a series diode D5 in the incoming diode circuit, such diodes are capable of working at very low signal levels. For the same reason, it is preferable that the transistor TR is a germanium transistor. Nevertheless, silicon devices have been used with some success. The diodes D4 and D6 on the other hand should be silicon types because of the high reverse resistance of this kind of diode. The diodes of the bridge DB should be of silicon, because delayed forward characteristics are required to give the correct limiting effect on incoming signal voltages.

As described above, the three amplifiers A1, A2 and A3 are integrated circuit components, but of course they may be replaced by suitably constructed circuits employing discrete components if so desired. The resistors R2, R10 and R14 connected from the non-inverting inputs of the amplifiers to earth are provided to reduce drift in the outputs of the amplifiers.

The value of the unilateralization factor is not critical. Usually it has to be at least two to ensure the handling of the unilateralized signal in the switching parts of the circuit without clipping of peaks in the voice frequency signal. A value of three is used in the present conference amplifier. Greater values may be used. The upper limit at which auidible distortion of beginnings of syllables occurs is not yet known, but there is a possibility that with higher values than three audible distortion of the voice frequency component of the unilateralized signal would occur, under steady state conditions, which would have to be dealt with by introducing a low pass filter, for envelope smoothing into the unilateralizer rectifier. Although, in the unilateralizer shown in the FIGURE, a transformer is employed to provide the reversibility (de-unilateralization) and DC isolation from the line of the voice frequency component transfer in the circuit, it will be appreciated that another arrangement, for example, employing radio frequency or visual or infra-red light coupling could alternatively be used. In some applications, e.g. loudspeaking telephone and two-wire amplifier, unilateralizers do not have to pass signals in a backwards direction and the combining of the d.c. and a.c. components can conveniently be done with a buffer amplifier and capacitor coupling.

Although the invention has been described with reference to a specific embodiment it will be apparent that many changes can be made without departing from the invention.

One change is to use negative unilateralization instead of the positive described. To do this, the polarity of the diodes D1, D2, D3, D4, D5 and D6 and of the capacitors C1 and C2 are reversed and an NPN transistor substituted for the PNP transistor TR. The operation is then the same as described except that negative going signals appear instead of positive going, and vice versa.

It will also be appreciated that the term "voice frequency signal" is not intended to limit the frequency range of the invention which extends at least throughout the audio frequency range as frequency is not a critical factor in the operation of the invention.

What we claim is:

1. A telephone conference amplifier arrangement having a plurality of channels each of which includes means for receiving an input signal, means for producing an envelope signal from the input signal, means for combining the envelope signal and the input signal to produce a unidirectional polarity signal, first unilaterally conducting means connecting the particular channel to a point common to all of the channels for applying the unidirectional polarity signal of the particular channel to the point, second unilaterally conducting means connecting the common point to the particular channel to apply a unidirectional polarity signal at the common point to the particular channel, and means for deriving an output signal from the unidirectional polarity signal applied to the particular channel from the common point wherein feedback means is provided in each channel responsive to the unidirectional polarity signal from the common point and connected from the second unilaterally conducting means of the particular channel to the means for producing an envelope signal of the particular channel from the input signal for opposing the generation of an envelope signal.

2. An arrangement according to claim 1 in which each channel includes a transformer having a primary winding to which the input signal is applied and two secondary windings, one of which is connected to the input of the means for producing an envelope signal and the other of which is connected in series with the output of the means for producing an envelope signal so that the envelope signal is combined with the input signal by the other secondary winding, the output of the means for producing an envelope signal being shunted by a capacitor offering little impedance at input signal frequency but not significantly attenuating the input and output signals.

3. An arrangement according to claim 2 in which the means for producing an envelope signal includes a rectifying means and smoothing means connected to an output of the rectifying means.

4. An arrangement according to claim 3, in which the rectifying means and the first and second unilaterally conducting means of each channel each include an inverting d.c. amplifier and two resistive feedback paths over the amplifier, the paths including respective diode means having unlike electrodes connected to the amplifier output, an output connection being provided joined to the output of the amplifier through one of the doide means of the feedback path.

5. An arrangement according to claim 4, in which the second unilaterally conducting means of each channel, one of the diode means of the feedback path is the base-emitter diode of a transistor, the collector of which is connected to the one secondary winding of the transformer in such a sense as to tend to oppose the output signal induced therein due to the connection of the other secondary winding to the second unilaterally conducting means, and also to oppose the production of an envelope signal.

* * * * *